United States Patent [19]

Marson et al.

[11] Patent Number: 4,846,708
[45] Date of Patent: Jul. 11, 1989

[54] JACK SECURITY DEVICE

[75] Inventors: Albert U. Marson, Riverview; Joseph A. Marson, Allen Park, both of Mich.

[73] Assignee: Michigan Bell Telephone Company, Detroit, Mich.

[21] Appl. No.: 155,344

[22] Filed: Feb. 11, 1988

[51] Int. Cl.[4] .......................................... H01R 13/447
[52] U.S. Cl. ..................................... 439/133; 70/168; 439/147
[58] Field of Search ............... 439/133, 135, 136, 144, 439/147; 379/445, 438, 439; 174/66, 67; 70/163, 167, 168, 169

[56] References Cited

U.S. PATENT DOCUMENTS

| | | | |
|---|---|---|---|
| 1,878,436 | 9/1932 | Burroughs | 70/168 |
| 1,950,205 | 3/1934 | Young | 411/508 |
| 2,288,241 | 6/1942 | Holcomb | 439/133 |
| 2,563,094 | 8/1951 | Becker | 232/24 |
| 2,864,906 | 12/1958 | Medenbach | 379/445 |
| 2,955,272 | 10/1960 | Gallardo | 439/134 |
| 2,978,613 | 4/1961 | Hein | 439/133 |
| 2,987,909 | 6/1961 | Shlank | 70/168 |
| 3,031,875 | 5/1962 | Brown | 70/168 |
| 3,293,588 | 12/1966 | Blonder | 439/133 |
| 3,363,216 | 1/1968 | Benedetto | 439/147 |
| 3,428,936 | 2/1969 | Arnao, Jr. | 439/144 |
| 3,693,494 | 9/1972 | Meyer | 411/508 |
| 3,749,815 | 7/1973 | Boatwright et al. | 439/142 |
| 3,794,278 | 2/1974 | Frey, Jr. et al. | 248/27.3 |
| 3,811,104 | 5/1974 | Caldwell | 439/135 |
| 3,972,579 | 8/1976 | Kohaut | 439/131 |
| 4,093,331 | 6/1978 | Molchan | 439/144 |
| 4,311,883 | 1/1982 | Kidney | 439/133 |
| 4,473,265 | 9/1984 | Dellinger et al. | 439/147 |
| 4,479,688 | 10/1984 | Jennings | 439/133 |
| 4,494,809 | 1/1985 | Soloman | 439/369 |
| 4,575,169 | 3/1986 | Duplatre et al. | 439/142 |
| 4,584,856 | 4/1986 | Petersdorff et al. | 439/133 |
| 4,607,900 | 8/1986 | Andrews et al. | 439/144 |
| 4,645,284 | 2/1987 | Duplatre et al. | 439/142 |
| 4,740,168 | 4/1988 | Carney et al. | 439/133 |
| 4,749,359 | 6/1988 | White | 379/438 |

*Primary Examiner*—Neil Abrams
*Attorney, Agent, or Firm*—Harness, Dickey & Pierce

[57] ABSTRACT

A jack security device, especially suitable for standard telephone jacks mounted at a panel of an access cabinet, can either prevent unauthorized access to a secured empty jack or prevent removal of a plug from a jack in use. An end portion of the device partially covers the plug receiving jack opening. The main body of the device carries a key-actuated tumbler and slides into an access cabinet housing recess adjacent to the jack. A locking tab carried by an inner end of the tumbler engages a surface provided in the housing to place the device in a locked condition with the flanged end portion partially covering the secure jack. Additionally, arrangements within the access cabinet are provided for overriding a locked condition of the device without the need for a lock actuating key.

30 Claims, 10 Drawing Sheets

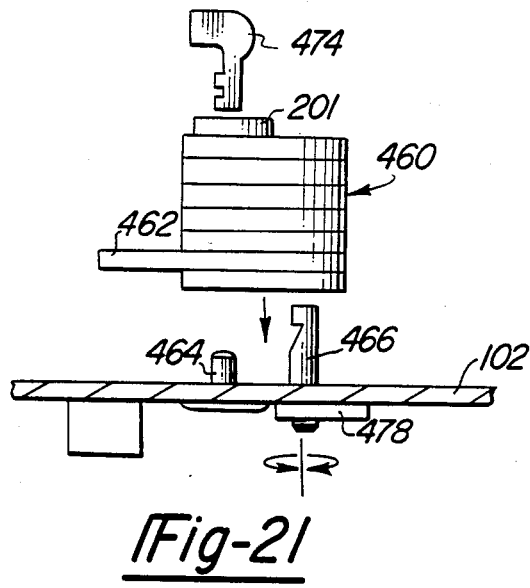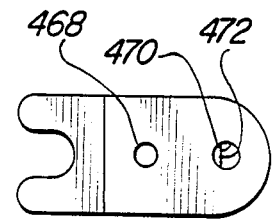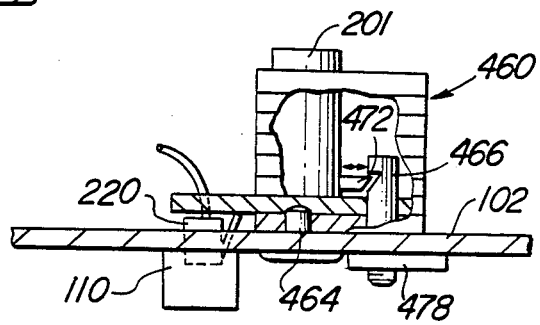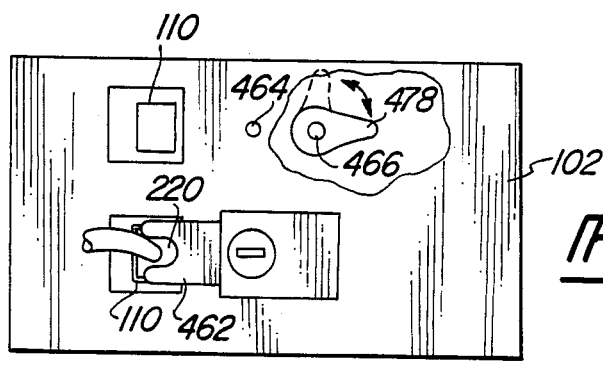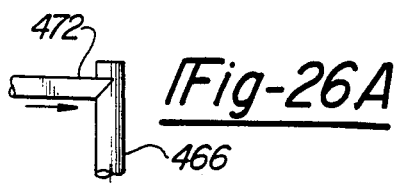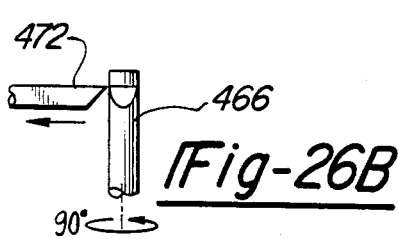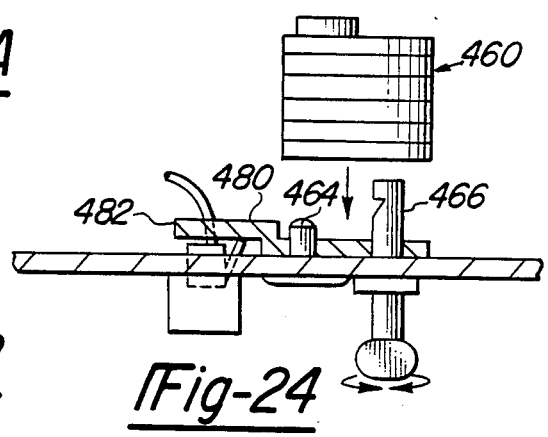

JACK SECURITY DEVICE

BACKGROUND OF THE INVENTION

The invention relates generally to devices which prevent tampering with cable connectors. More specifically, the invention concerns a security device for preventing unauthorized insertion or removal of a plug from a mating jack, while still enabling an authorized entity to override the prevention mechanism.

As the result of recent changes in the telephone industry, most telecommunications subscribers no longer rent their telecommunications equipment from their local telephone company. Instead, they either own their own telephones, PBX's or other equipment customarily installed on the subscriber's premises, or they lease such equipment from telecommunications companies. With the advent of subscriber-owned equipment, especially in the office building, apartment, or dormitory environment, a need has arisen for enabling the telephone or communications concern to conveniently obtain access to the subscriber-owned equipment with a network interface at a centralized location on the subscriber premises.

However, such centralization, along with modularization of components enabling their interconnection via standardized plug-ended cords and mating jack receptacles, poses a problem at the centralized access point. The subscribers must have access to the plug receiving jacks, yet must be able to prevent unauthorized tampering with the desired arrangements of the equipment at the telephone or communication concern's jack-ended interface. This problem is especially aggravated where more than one subscriber entity may be resident in the same building served by a common telephone company access interface point. In this situation, a security system would appear highly beneficial in preventing one group of subscribers from interfering with or tampering with the arrangements at the interface of another group of subscribers. In addition, it is necessary for authorized personnel from the telephone company or the communications concern to have access to all jacks and connectors.

SUMMARY OF THE INVENTION

It is an object of this invention to provide a jack security device and system especially tailored for use in a communications interface environment using standard plug-ended equipment cords mating with a standard jack.

In accordance with the invention, a security device for preventing the insertion or removal of a plug into or from a jack opening at a first side of a wall includes a main device body portion shaped for sliding receipt in a recess of the jack mounting wall located adjacent to the jack opening. A tongue portion extends from the main body portion and covers a portion of the jack opening whenever the main body portion is inserted into the adjacent wall recess. The security device further includes an opening in the tongue portion suitably positioned and dimensioned for allowing passage of a cable connected to the plug to pass therethrough. Locking apparatus carried by the main body portion and having a movable element protruding therefrom is configured in a locking position so as to engage a latching surface associated with an inner side of the wall.

It is a feature of this invention that the locked condition of the jack securing device may be overridden without the necessity of an unlocking device by separate means accessible only to an authorized party, such as the telephone or communications company.

BRIEF DESCRIPTION OF THE DRAWINGS

These and other objects and features of the invention will become apparent from a reading of a detailed description taken in conjunction with the drawing, in which:

FIG. 21 is a cross-sectional view of still another embodiment of the invention with locking mechanism shown in elevation;

FIG. 22 is a cut away cross-sectional view illustrating the internal locking mechanism of the embodiment of FIG. 21;

FIG. 23 is a plan view of the embodiment of FIG. 21, with a portion of panel cut away to illustrate the override feature;

FIG. 24 is an alternate embodiment of jack security device;

FIG. 25 is an underside view of the locking mechanism of FIG. 21; and

FIGS. 26A and 26B illustrate the operation of the override feature of the embodiment of FIGS. 17 and 18 in greater detail.

DETAILED DESCRIPTION

Figure 1A:
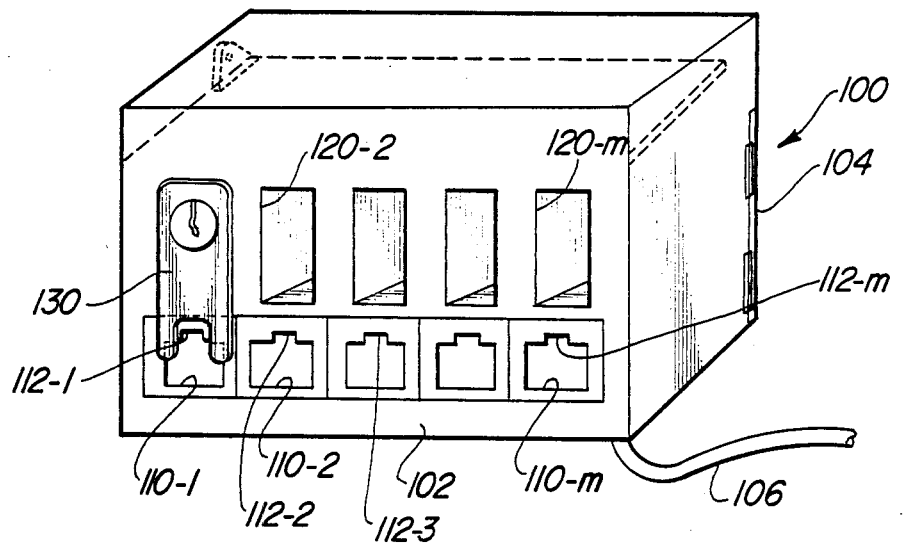
FIG. 1A is a perspective view of an access cabinet having an array of jacks and associated recesses arranged for use with a security system designed in accordance with the principles of the invention.

With reference to FIG. 1A, a first embodiment of the invention is illustrated. In FIG. 1A an access cabinet 100 is shown having a plurality of jack positions 110-1 through 110-m opening at a front wall 102. Adjacent to each jack opening is a corresponding recess 120-1 through 120-m shaped for sliding receipt of a jack security device 130, one of which is shown in recess 120-1 of FIG. 1A. The jacks and mating plugs may be of the RJ11 type in common use throughout the telephone industry. As is well known in the art, each RJ11 type jack includes a cut out portion at a perimeter of the jack opening, shown as 112-1 through 112-m in FIG. 1A, which receives a flexible locking tab element protruding from the typical RJ11 plug. The locking tab element is designated by numeral 221 in FIG. 1A. Although positions for five jacks and associated security devices are shown, it will be understood that m could be any suitable number. Shoulders on the flexible locking tab engage the areas on either side of areas 112 to lock the plug in its mated position within the jack. A plug is removed from its RJ11 type jack by manually depressing the spring loaded locking tab downwardly in FIG. 1A from the recess 112 to enable the extraction of the plug from the jack.

Figure 1B:
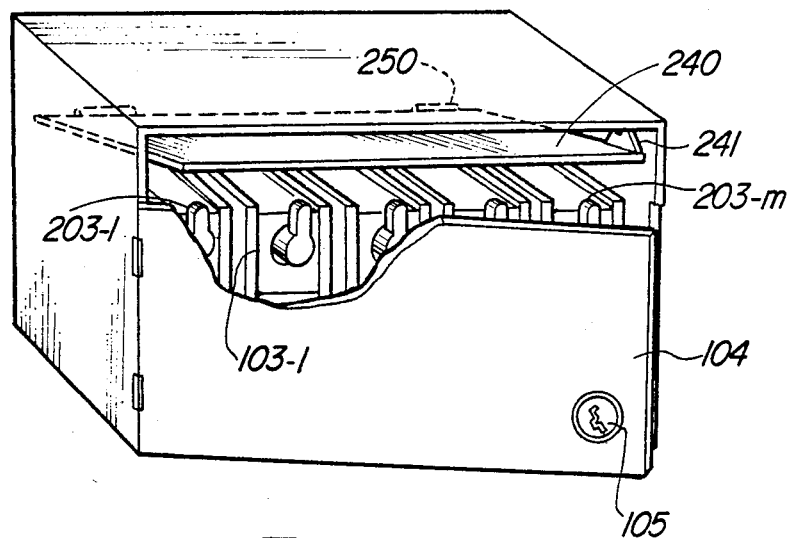
FIG. 1B is a perspective view of the access cabinet of FIG. 1A taken from the rear of the cabinet.

As seen from FIG. 1B, access cabinet 100 additionally includes a rear door 104 which may be locked in any of a number of known ways, such as with a key or combination lock, the keyhole 105 being shown in FIG. 1B. Typically, access to the cabinet via rear door 104 would only be effected by telephone company or communication concern personnel responsible for interfacing the company's equipment to subscriber-owned apparatus designed for plug-ended termination at the access cabinet via jacks 110. In FIG. 1A, cable 106 coming from the communications or telephone network is shown entering a bottom surface of cabinet 100 at a suitable sealed port, not shown.

It is also to be understood that the principles of the invention apply equally well to openings in a wall, the other side of which would be accessible only by authorized telephone company personnel. For example, a separate locked room could be available for telephone company equipment, one wall of which would be available for subscriber access at its other side via jacks 110.

Figure 2A:
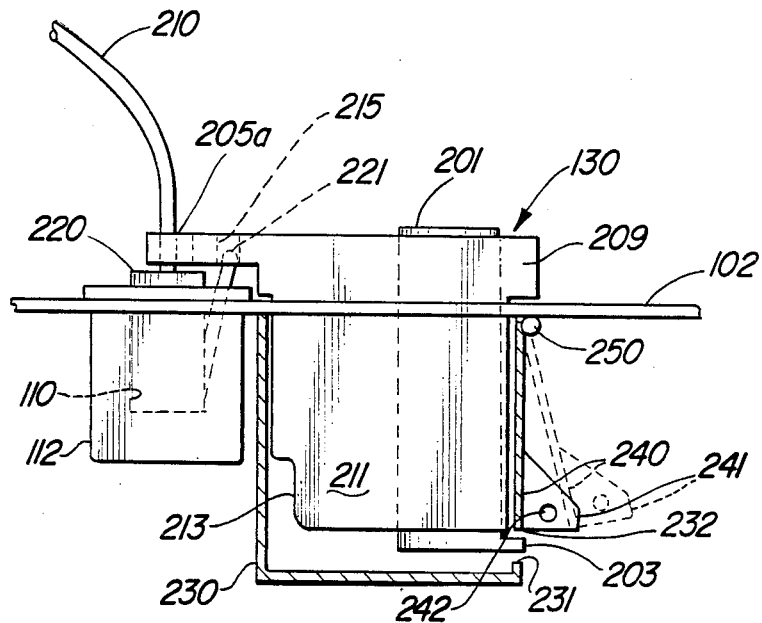
FIG. 2A is a side cross-sectional view of one of the jack positions of the cabinet of FIG. 1A with a security device shown inserted into an associated recess.
Figure 2B:
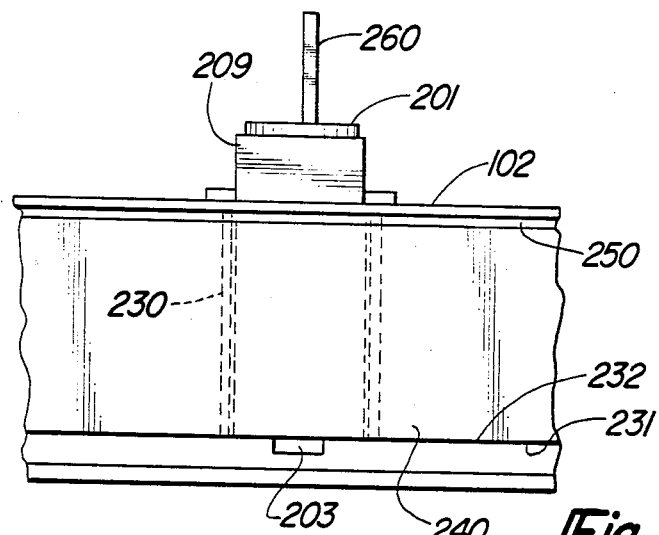
FIG. 2B is an end view of the apparatus of FIG. 2A.
Figure 3:
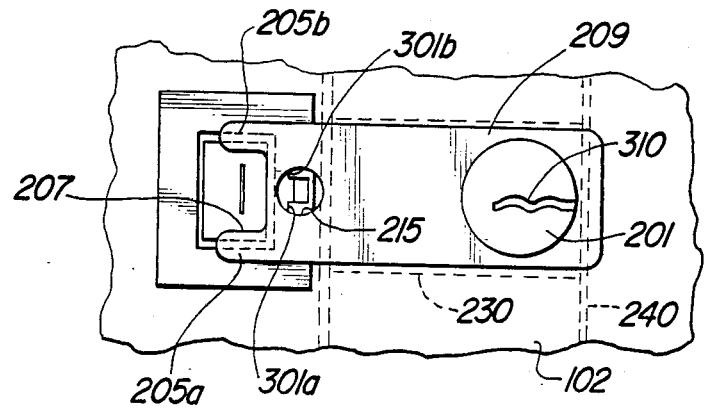
FIG. 3 is a top view of the apparatus of FIG. 2A.
Figure 4:
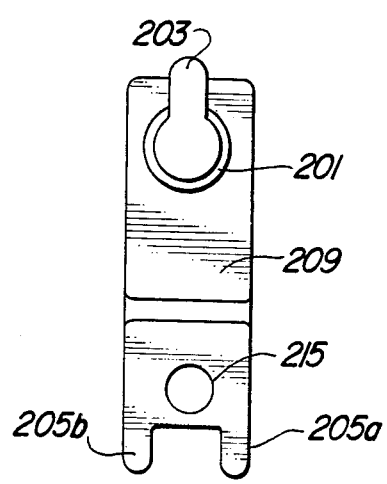
FIG. 4 is a bottom view of the security device shown in FIG. 2A.

Further details of the jack security device and its arrangement with the jack mounting wall may be explained in conjunction with reference to FIGS. 1B, 2A, 2B, 3 and 4. Jack security device 130 includes a top flanged portion 209 and a main body portion 211 resting in a recess in the wall 102 of cabinet 100 defined by internal housing walls 230 and a recess wall 240. Journaled for rotation in main body portion 211 is a tumbler mechanism 201 which, as shown in FIG. 3 includes a keyhole 310 facing outwardly of the panel wall 102. Therefore, the tumbler 201 is rotatable only upon the insertion of a mating key into keyway 310. In the alternative, a combination lock or other suitable locking mechanism may be used. As seen from FIGS. 2A and 3, the recess for holding the main body portion of the security device is positioned adjacent to the jack opening 110 of the connector 112 at the wall 102 such that a tongue portion comprising members 205a and 205b partially cover the jack position on the wall whether or not a plug is resident therein. It will be noted that the view of FIG. 2A shows a plug 220 matingly engaging the socket of the jack, while the view of FIG. 3 shows the apparatus without the presence of a plug for clarity.

The tongue portion of security device 130 also includes an opening 215 positioned to capture an end portion of flexible plug locking tab 221. As seen from FIG. 3, plug locking tab 221 will, via conventional shoulders, engage areas 301a and 301b of the jack opening to hold the plug in the socket unless the locking tab is pushed inwardly of the jack socket perimeter. Hence with the security device 130 shown in place over a plug, access to the unlocking tab 221 is prevented. Even in the absence of a plug, protruding portions 205a and 205b of the tongue area of the security device are dimensioned such that a sufficient area of the jack opening is covered, thereby preventing unauthorized insertion of plug-ended equipment into the jack receptacle. Additionally, the protruding elements 205a and 205b are simultaneously configured such that they will overlie a plug 220 inserted into the jack receptacle 110 in a manner preventing its extraction even in the absence of a flexible locking tab 221. The portions 205a and 205b define a three sided opening or slot 207 through which a plug wire 210 connected to the plug may pass.

At the end of the tumbler mechanism 201 housed in the recess of wall 102, a latching or locking tab 203 protrudes from the tumbler into a receiving slot 231 separating housing wall 230 from recess wall 240. Hence, in a locked condition (as shown in FIG. 2A) upon attempted withdrawal of jack security device 130 from the recess, locking tab 203 will engage a latching portion 232 of recess wall 240 thereby preventing the extraction of the security device.

Although the security device is placed in its locked position, the invention contemplates arrangements for enabling authorized personnel, such as telephone company technicians, to override the locked condition and remove the security device 130 without the necessity for inserting an appropriate key 260 into keyway 310 and rotating the locking tab 203 out of engagement with the latching portion 232 of recess wall 240.

A first approach to providing such overriding capability is set forth in FIG. 1B and FIG. 2A where it is seen that the recess wall 240 is hinged at 250 such that wall 240 may be pivotally swung away from the main body portion of the security device 211 as shown in dashed lines at the phantom position of wall 240 in FIG. 2A. Such pivotal motion of wall 240 would be effected only by authorized personnel having access to the interior of the cabinet 100 through the rear.

Additionally, as seen from FIG. 1B, wall 240 may be shared by a plurality of jack security devices, any of which may be removed upon appropriate movement of wall 240 away from the body portions 211. Wall 240 is also provided with at least one tab element 241 for securing wall 240 in its non-overriding position via. For example, a screw passing through opening 242 and threadedly engaging a hole in an interior surface of cabinet 100 or a separate padlock (not shown) could serve this function.

As further seen from FIG. 2A, the main body portion 211 of jack security device 130 includes an undercut as at 213. Undercut 213 enables an arrangement wherein the degree of pivotal separation of recess wall 240 may be limited due to the presence of other adjacent equipment within the cabinet. The dimension from the lower surface upward of the undercut portion 213 is sized such that the jack security device 130 is raised outwardly of the recess until the locking tab 203 again engages the swung out wall 240 shown in phantom dashed lines. Then the body of the security device 130 may be shifted toward the left as viewed from FIG. 2A thereby again providing clearance between locking tab 203 and the wall 240 such that the jack security device 130 may be completely extracted from the recess in wall 102.

Figure 9:
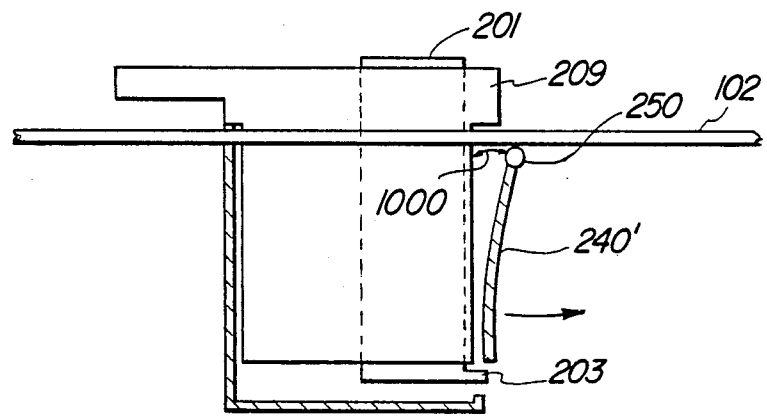
FIG. 9 is a first alternative arrangement of the hinged wall 240 of FIGS. 2A and 2B.
Figure 10:
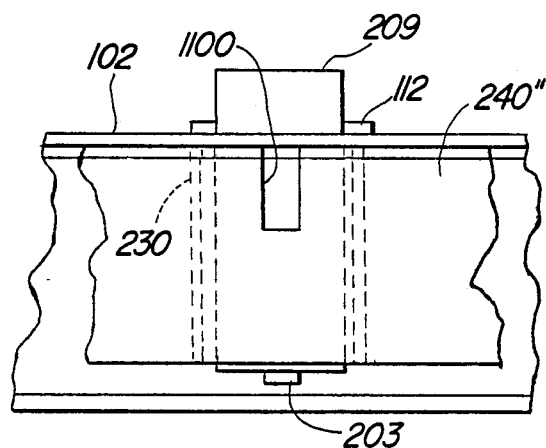
FIG. 10 is a second alternative arrangement of the hinged wall 240 of FIGS. 2A and 2B.

FIGS. 9 and 10 set forth alternative arrangements for wall 240 of FIGS. 1B, 2A and 2B which will avoid the need for providing undercut 213 (FIG. 2A) in main body portion 211 of jack security device 130.

As seen from FIG. 9, hinged wall 240', unlike its counterpart 24 in FIG. 2A, has its hinge element 250 spaced a distance shown as 1000. Wall 240' is curved or otherwise shaped such that its lower portion will provide a locking surface for locking tab 203. Dimension 1000 is chosen such that whenever wall 240' is swung outwardly of body 211, security device 130 may be extracted from its socket with little or no tilting or shifting required, since the upper portion of wall 240' is coupled to hinge 250 at a point providing clearance for locking tab 203. If it is desired to remove device 130 with no shifting or tilting, it may be necessary to form a notched opening in panel 102 immediately above locking tab 203.

In FIG. 10, the need for an undercut is avoided by providing an opening 1100 in the top portion of wall 240'' (one opening of course being provided for each security device being served by wall 240''). Opening 1100 is positioned and sized such that a clearance is provided for locking tab 203 when wall 240'' is swung away from body portion 211 and a jack security device 130 is pulled straight out of its receiving cavity in cabinet 100.

Figure 5A:
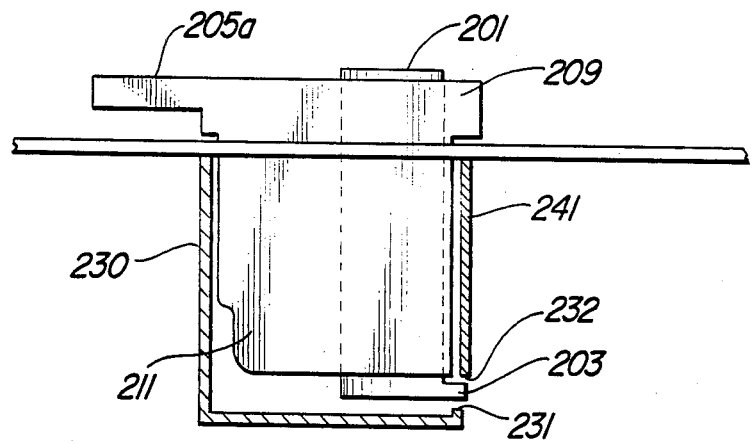
FIG. 5A is a side view of a first alternative approach to providing locking override.
Figure 5B:
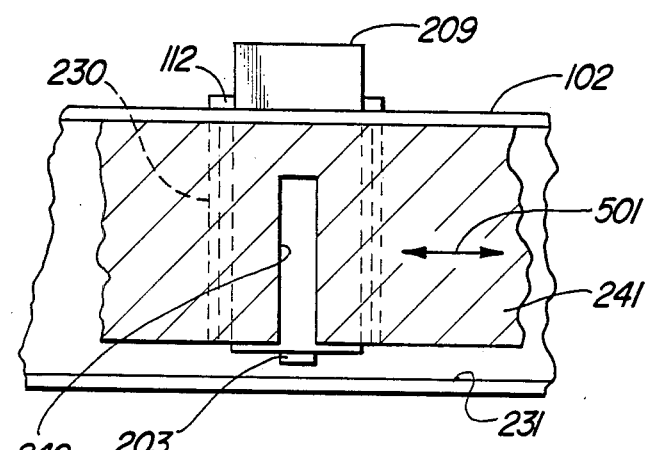
FIG. 5B is a view taken normal to the latch bar 241 of FIG. 5A.

A first alternative lock override or bypass arrangement is set forth in FIGS. 5A and 5B. In the arrangement of FIGS. 5A and 5B, the hinged recess wall of FIG. 2A is replaced by a sliding latch bar 241. Latch bar 241 slides in the directions of the arrow 501 of FIG. 5B and is provided with a slot 242 in the latch bar which, when the security device is in its locked condition, is displaced from locking tab 203 such that tab 203 can engage the undersurface edge 232 of sliding latch bar 241. When override is desired, the latch bar 241 is slid for example to the left in FIG. 5B such that slot 242 directly overlies locking tab 203. Under this condition, the main body portion 211 of the security device may be raised upwardly in the recess by the locking tab 203 riding up the slot 242.

Figure 6:
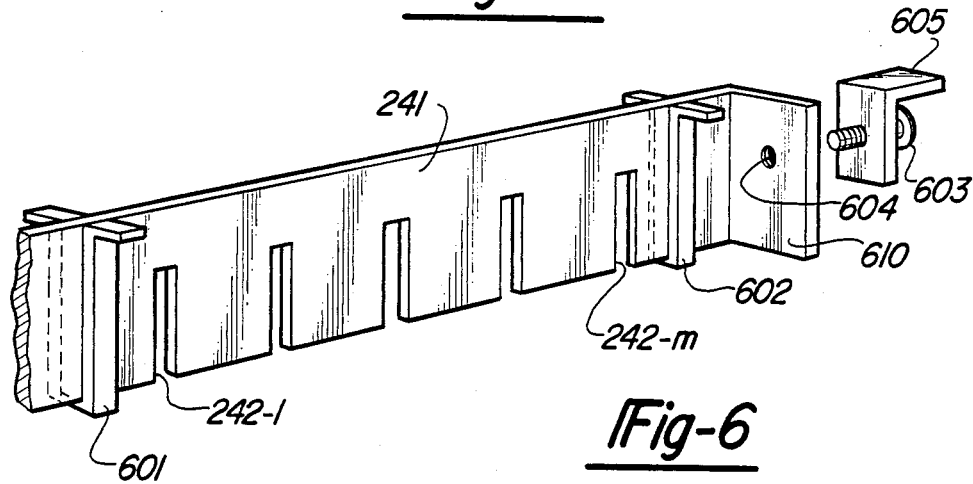
FIG. 6 is a perspective view of sliding latch bar 241 of FIG. 5B.

As with the approach set forth with reference to FIG. 2A, the overriding apparatus of FIGS. 5A and 5B may be arranged such that a single element enables the substantially simultaneous override of a plurality of jack security devices housed in recesses appropriately aligned in wall 102 of panel 100. For example, as seen in FIG. 6, sliding latch bar 241 may have a plurality of slots 242-1 through 242-m, each associated with a separate jack security device and its corresponding locking tab element. The latch bar 241 would be mounted via brackets 601 and 602 to appropriately positioned internal surfaces of the cabinet and could be bolted into a non-overriding position through use of a retaining bracket 605 coupled to a flanged end 610 of latch bar 241 via retaining screw 603 engaging threaded hole 604 in flange 610.

Figure 7A:
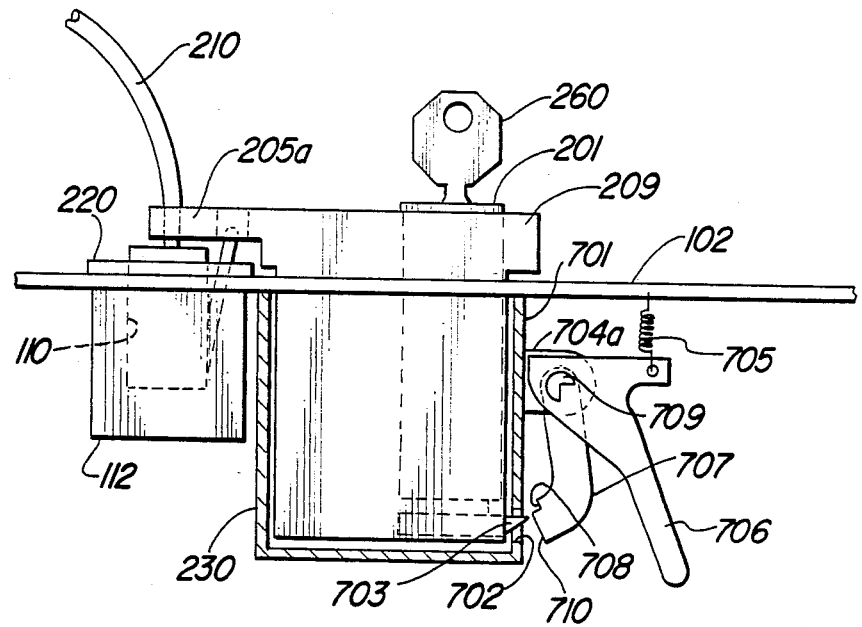
FIG. 7A is a side view of a second alternative approach to providing locking override.
Figure 7B:
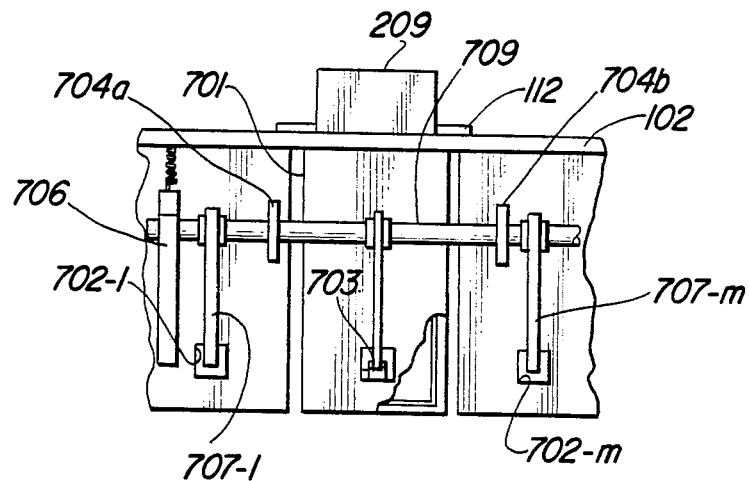
FIG. 7B is a view taken normal to the fixed wall 701 of FIG. 7A.

A second alternative arrangement for providing the override feature may be explained with reference to FIGS. 7A and 7B. In the arrangement of FIGS. 7A and 7B, the tumbler mechanism 201 is provided at its internal end with a spring loaded locking tab 703 or a conventional spring loaded striker mechanism associated with a lock tumbler. Striker 703 would, under subscriber control, be retracted from aperture 702 in fixed wall 701 via turning of key 260. To override the locked condition via access to the other side of wall 102 in the cabinet 100, the technician could inwardly depress the striker 703 using, if necessary, a suitable tool such as a screw driver while simultaneously urging the security device outwardly of the recess.

As with the previously discussed override arrangements, that shown in FIGS. 7A and 7B may also be used to simultaneously serve a plurality of jack security devices. To provide for simultaneous depression of a plurality of strikers 703, a like plurality of release tabs 707 abut strikers 703 at bearing protrusions 710. The release tabs 707-1 through 707-m are coupled to an override assembly shaft 709 which is, in turn, mounted to wall 701 via shaft retainers 704a and 704b. Additionally coupled to shaft 709 is a release lever 706 which is also coupled to cabinet wall 102 via a return spring 705.

Figure 8:
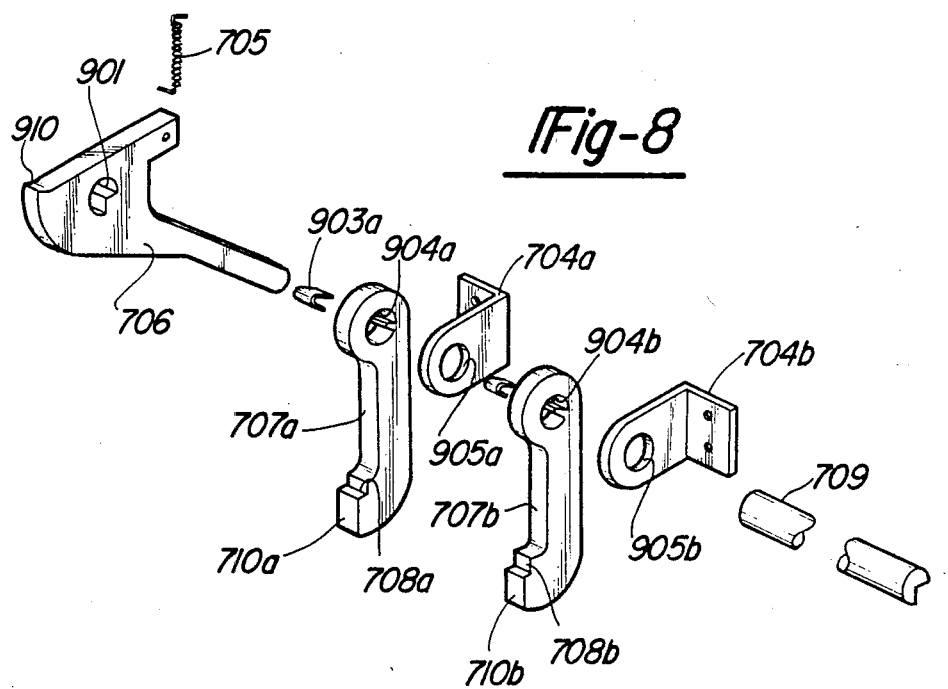
FIG. 8 is an exploded perspective view of the lock override apparatus of FIGS. 7A and 7B.

The override elements are shown in an exploded perspective view in FIG. 8, where two release tabs 707a and 707b are depicted. Assembly shaft 709 includes a longitudinally extending notch of about one fourth the circular area of a cross section of the shaft. Shaft 709 is mounted to wall 701 by passing through holes 905a and 905b of shaft retainers 704a and 704b, respectively. Shaft 709 is additionally coupled to release tabs 707a and 707b by passing through openings 904a and 904b in conjunction with release tab springs 903a and 903b. Finally, shaft 709 is coupled to release lever 706 by passing through a mating ¾ circular hole 901 in lever 706. Lever 706 additionally includes hole 902 for retaining receipt of one end of return spring 705.

With reference to FIGS. 7A and 7B, authorized personnel would access the mounting cabinet and override the locked jack security devices by depressing lever 706 toward wall 701 to rotate shaft 709. Rotation of shaft 709 applies force on release tab 707 to rotate the release tab in the same direction. Protrusion 710 on release tab 707 is not as large as the longitudinal one-quarter area notch in assembly shaft 709, thereby allowing release tab 707 to rotate approximately 75 degrees. Release tab spring 903 holds the release tab in the start, or non-overriding position. Hence, the lever 706 may be used to simultaneously operate all release tabs coupled to shaft 709. Alternatively, individual tabs 707 may be rotated to release only a preselected locked jack security device. Return spring 705 returns all release tabs to the non-override position, while return stop 910 on lever 706 stops the entire assembly in the proper starting position. Tab stop 708 allows the protrusion 710 of release tab 707 to enter aperture 702 to an extent slightly greater than the thickness of wall 701 to depress striker 703 a distance enabling withdrawal of the jack security device. Wall 701 is shown in FIG. 7B as having separate sections for each jack security device. It will, of course, be appreciated that, alternatively, wall 701 could take the form of a unitary piece serving all on security devices.

Figure 11:
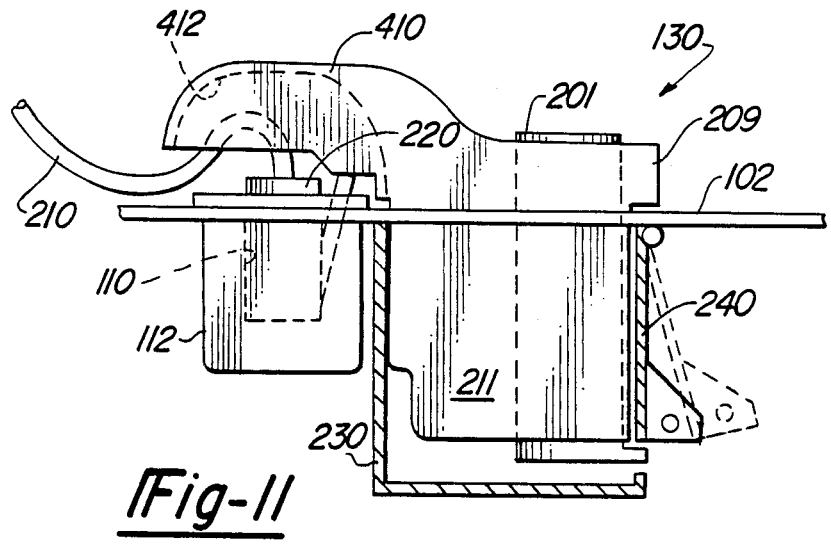
FIG. 11 is a side cross-sectional view of another embodiment of the invention.
Figure 12:
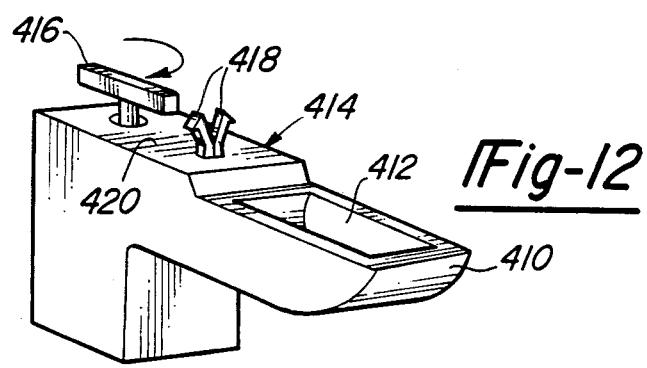
FIG. 12 is a perspective view of yet another embodiment of the invention.

FIG. 11 illustrates another embodiment of the invention in which the jack security device 130 has a modified protruding element 410 which is designed to substantially overlie the jack 110. Protruding element 410 has a hollowed out underportion 412, which provides sufficient clearance for the plug wire 210 and plug 220. The hollowed out protruding element 410 prevents the removal of plug 220 from jack 110 and also prevents the insertion of a plug or other foreign object into jack 110 by completely or substantially covering the jack opening. As illustrated, the jack security device 130 fits into panel wall 102 in a fashion comparable to the embodiment of FIG. 2A. Accordingly, like components in FIGS. 11 and 2A have been given like reference numerals.

In the foregoing embodiments, the jack security device 130 has been adapted for insertion into a cut out portion or recess in the panel wall. The invention may also be practiced using a surface mounted jack security device and several examples of such surface mounted devices are depicted in FIGS. 12-26 and are described below.

Figure 13:
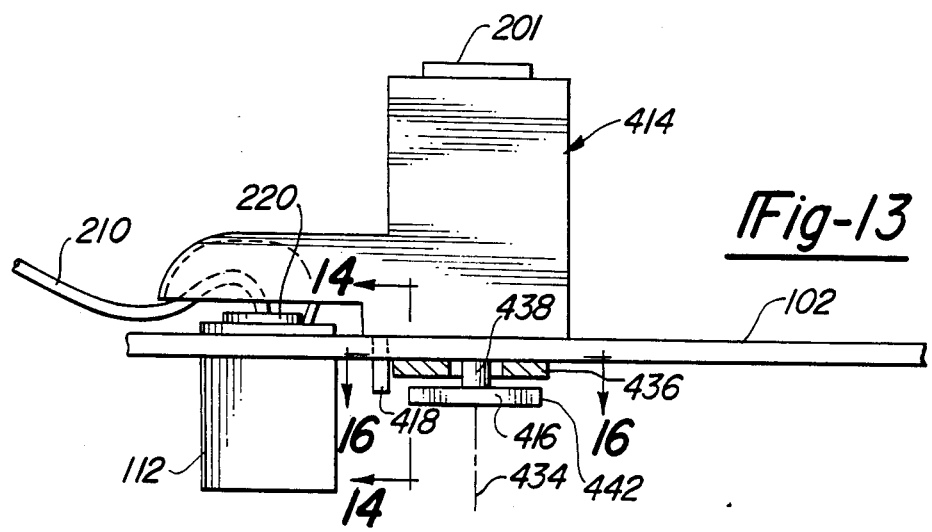
FIG. 13 is a cross-sectional view of the embodiment of FIG. 12, illustrating the jack security device in use.

Referring first to FIGS. 12-16, a first embodiment of surface mounted jack security device is illustrated. Specifically, the jack security device 414 is shown with underside facing up in FIG. 12. The security device includes a protruding element 410 with hollowed out underportion 412. The protruding element 410 is adapted to overlie the jack 110 so that it covers plug 220 and is adapted to accommodate plug wire 210, as illustrated in FIG. 13.

Jack security device 414 has a rotatable T-bar locking member 416 and a pair of spring loaded holding tabs 418 on the underside surface 420 of jack security device 414.

Figure 15:
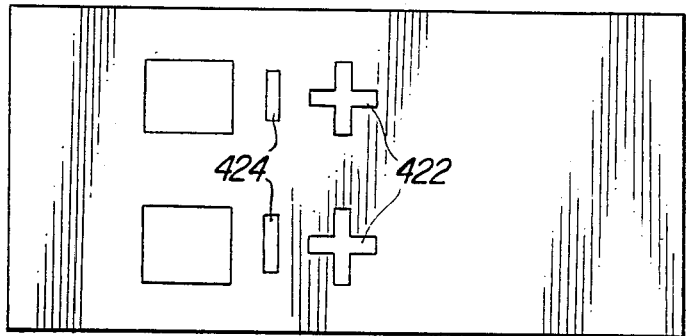
FIG. 15 is a plan view of the panel of the embodiment of FIG. 13.

Referring to FIGS. 13 and 15, panel 102 includes a plurality of star-shaped cut outs 422 and a corresponding plurality of slots 424, arranged as shown in FIG. 15. Star-shaped cut outs 422 receive the T-bar locking members 416 while slots 424 receive the spring loaded holding tabs 418. As shown in detail FIG. 14, the spring loaded holding tabs 418 are pivoted at rocker points 426 and are spring biased at 428. The holding tabs are arranged so that they will move inwardly against the spring bias tension when depressed into slot 424. Once fully depressed, the spring bias causes the holding tabs to spread apart to the position of rest shown in FIG. 14. The holding tabs each have an inclined frontal surface 430 which acts as an inclined plane to facilitate insertion into slot 424. The inclined undersurface 432 permits the holding tab from being pulled back out through slot 424 once inserted by overcoming the spring force of springs 428.

Figure 16:
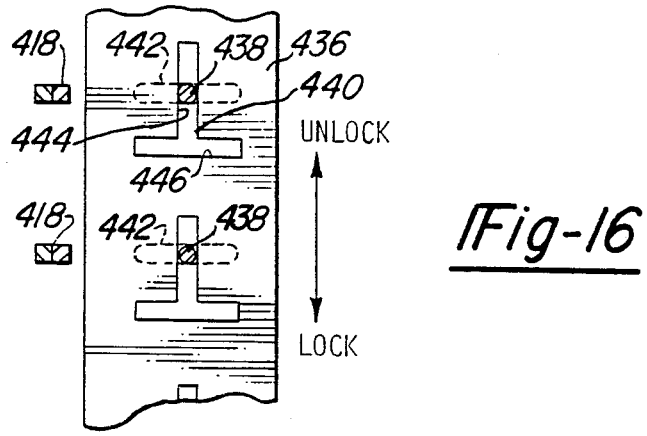
FIG. 16 is a detailed fragmentary view of the sliding locking bar of the embodiment of FIGS. 12 and 13, taken substantially along the line 16—16 in FIG. 13.
Figure 14:
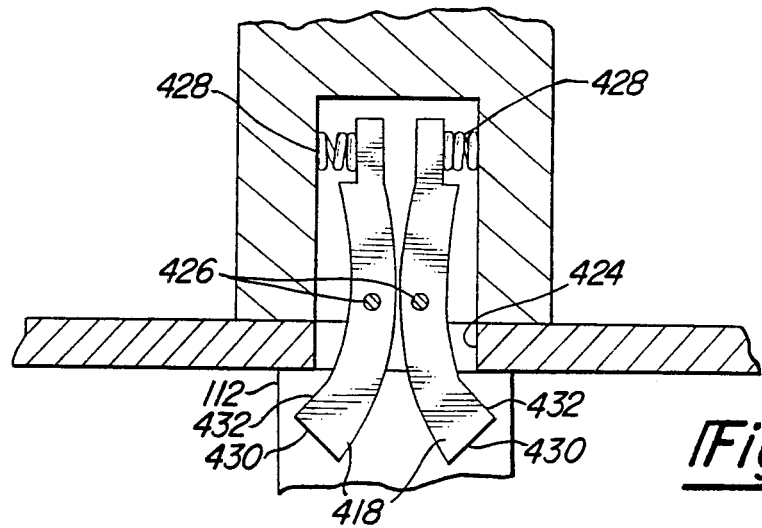
FIG. 14 is a detailed cross-sectional view of the spring loaded tabs taken substantially along the line 14—14 of FIG. 13.

T-bar locking member 416 may be rotated about its axis 434 by operation of a key or similar mechanism or operating tumbler 201. The T-bar locking member 416 extends through sliding locking bar 436, shown in FIGS. 13 and 16. Sliding locking bar 436 is accessible from the interior or underside of panel wall 102 and may be slid between locked and unlocked positions. The locked position is illustrated in FIG. 16 wherein the shaft 438 is positioned in the middle of the center leg 444 of a T-shaped cut out 440. The cross member 442 of T-bar locking member 416 is shown in dotted lines in FIG. 16. With the cross member 442 oriented at right angles to the center leg 444 of the cut out 440, the interaction between sliding locking bar 436 and T-bar locking member 416 prevents the jack security device from being removed from panel 102. When the T-bar locking member 416 is rotated 90 degrees so the cross member 442 is now parallel to center leg 444, the jack security device 414 may be lifted away from panel 102.

In order to override the effect of locking bar 436, the technician with access to the inside or underside of panel 102 can slide the locking bar 436 to the unlocked position at which cross member 442 is lined up with and parallel to cross leg 446 of cut out 440. In this configuration the jack security device 414 may be lifted away from panel 102 even when the T-bar locking member 416 is in the locked orientation.

Another embodiment of surface mounted jack security device is illustrated in FIGS. 17-20. The jack security device 448 of FIGS. 17-20 employs a combination lock 450 as an alternative to the key actuated tumbler illustrated in the previous embodiments. It will be recognized that the combination lock and key actuated locks may be substituted for one another in any of the embodiments illustrated herein. As illustrated, the jack security device 448 has a protruding element 410 which is adapted to overlie the plug 220 and jack 110 in a fashion similar to that illustrated in FIGS. 2A and 3, for example.

Figure 17:
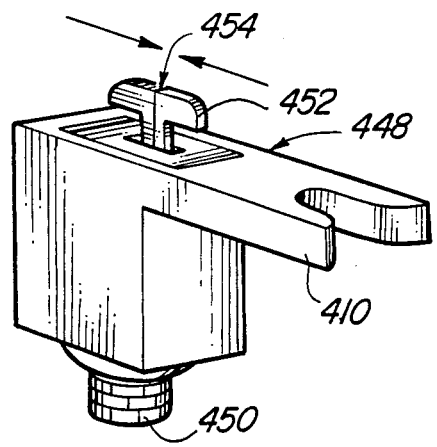
FIG. 17 is a perspective view of the jack security device of yet another embodiment of the invention.
Figure 18:
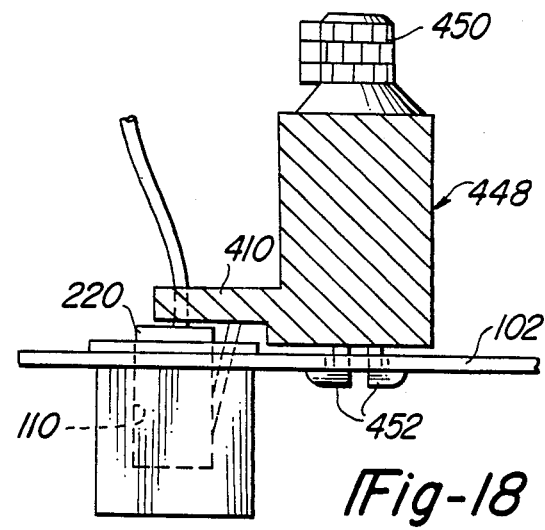
FIG. 18 is a cross-sectional view of the embodiment of FIG. 17, illustrating the jack security device in the installed position.
Figure 19:
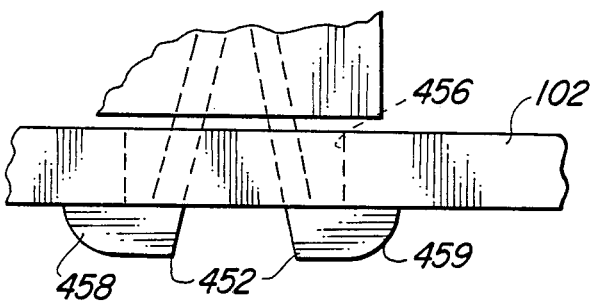
FIGS. 19 and 20 are detailed cross-sectional view illustrating the operation of the override feature of the jack security device of the embodiment of FIGS. 17 and 18.
Figure 20:
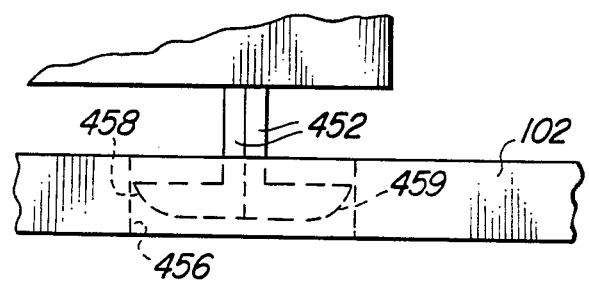

The jack security device 448 employs a modified split T-bar locking member 452 which is split down the middle as at 454 and capable of movement between the centrally retracted position shown in FIGS. 17 and 20 and the outwardly spread position shown in FIGS. 18 and 19. As shown in FIGS. 19 and 20, panel 102 is provided with a slot 456 into which T-bar locking member 452 may be inserted. Slot 456 is sized and member 452 is shaped with rounded edges on surfaces 458 and 459 so that T-bar locking member 452 slidingly snaps into place by depressing the locking member 452 into slot 456. The locking members are spring loaded so that they spread apart into the locked position of FIG. 19 once fully inserted. The locking members are connected to the combination lock 450 (or key actuated tumbler) so that operation of the proper combination (or turning the key) causes the locking member 452 to move to the inwardly retracted position of FIG. 20 for removal.

The jack security device 448 may be overridden by the technician who has access to the underside or inside of panel 102. The locking mechanism is overridden by pinching the T-bar locking member 452 to its inwardly retracted position by manually grasping surfaces 458 and 459 and urging the locking member into the closed or retracted position of FIG. 20. Thereafter, the entire jack security device 448 may be lifted away from panel 102.

Yet another embodiment of surface mounted jack security device is illustrated in FIGS. 21-24. Referring to FIG. 21, jack security device 460 comprises a laminated padlock wherein one of the laminations 462 forms an outwardly protruding element which is configured as shown in FIG. 23 to cover jack 110 to prevent plug 220 from being removed. Protruding lamination 462 also prevents a plug from being inserted into the jack.

As seen in FIG. 21, panel 102 is provided with alignment post 464 and notched locking post 466. The alignment post and locking post are aligned with the corresponding jack 110, as seen in FIG. 23. Jack security device is provided with a pair of apertures on the underside surface as shown in FIG. 25. The first aperture 468 is sized to matingly receive post 464, while the second aperture 470 is sized to receive locking post 466. As shown diagrammatically in FIG. 22, the jack security device houses an internal tumbler mechanism 201 which has a spring loaded catch 472 adapted to mate with notched locking post 466. The tumbler mechanism is constructed so the catch is spring biased toward the radially outward position and may be moved radially inwardly by either rotating the key 474 in the lock or by depressing inwardly on catch 472.

Locking post 466 is journaled for rotation about its axis and includes a lever 478 which is disposed on the underside of panel 102. Lever 478 may be actuated by the technician having access to the underside of panel 102 in order to rotate locking post 466. By rotating locking post 466 to the position shown in dotted lines in FIG. 23, the notched portion of the locking post is rotated out of engagement with catch 472. See detail in FIGS. 26A and 26B. Upon such rotation, catch 472 is forced radially inwardly by the camming action of locking post 466 (FIG. 26B). In the radially inward position, catch 472 rests o the cylindrical surface of locking post 466 to permit sliding between the catch and locking post in order to allow the jack security device 460 to be lifted upwardly and removed from panel 102.

An alternate embodiment employing this principal is illustrated in FIG. 24, wherein the jack security device 460 does not have a protruding lamination. Instead, a separate locking plate 480 is provided. Locking plate 480 fits over alignment post 464 and locking post 466 and has a raised tongue portion 482 which is configured to overlie the jack 110 similar to the protruding lamination 462 of FIG. 23. Engagement of jack security device 460 onto alignment post 464 and locking post 466 holds the locking plate 480 in place to prevent plug 220 from being removed from jack 110 and which similarly prevents a plug from being inserted into jack 110 if not already present.

The various approaches contemplated by the invention for providing override of a locked condition of the security device may be effected automatically upon opening of the rear door 104 of cabinet 100 or only upon manual intervention by the accessing technician. The devices 112 can be manufactured as separate units for each jack position or alternatively could come in modular arrays for a plurality of such jacks. The devices 112 and associated keys may be manufactured from metal or plastic, depending upon strength requirements and cost constraints.

The invention has been disclosed with reference to a detailed description of exemplary embodiments. Such details are presented for the sake of example only and are not intended as limitations to the scope and spirit of the invention defined in the appended claims.

What is claimed is:

1. A security device for preventing insertion and removal of a plug into and from a jack opening at a first side of a wall comprising:

a main body portion shaped for sliding receipt in a recess of the wall located adjacent to the jack opening;

a tongue portion extending from the main body portion and having an opening therein shaped for receipt therethrough of a cable, the tongue portion configured so as to cover a portion of the jack opening whenever the main body is inserted into the wall recess;

locking means carried by the main body portion and having a movable element protruding from the main body portion and configured in a locking position so as to engage a latching surface coupled to a second side of the wall; and movable means disposed on said second side of the wall for causing said movable element to disengage said latching surface.

2. The security device of claim 1 wherein the locking means comprises a key-actuated tumbler journaled for rotational movement in the main body portion, with a key receiving opening facing outwardly from the first side of the wall.

3. The security device of claim 2 wherein the movable element of the locking means comprises a rotatable locking tab protruding laterally of the tumbler and main body portion.

4. The security device of claim 1 wherein the tongue portion further comprises first and second members protruding from the main body portion to define a three-sided, cable-receiving opening, the first and second members configured so as to prevent extraction of a plug matingly engaging the jack and to prevent insertion of a mating plug into an empty jack whenever the main body portion is inserted into the wall recess.

5. The security device of claim 4 wherein the tongue portion further comprises a cavity shaped for capturing receipt of an end portion of a flexible locking pin extending outwardly of a plug matingly engaging the jack, thereby preventing actuation of the locking pin whenever the tongue portion overrides the plug.

6. A security system for preventing insertion and removal of a plug into and from a jack opening at a first side of a jack mounting wall comprising:

a recess in the jack mounting wall adjacent to the jack, the recess having a recess wall coupled to a second side of the jack mounting wall;

a jack security device having a main body portion shaped for sliding receipt in the recess, a tongue portion extending from the main body portion configured so as to cover a portion of the jack opening whenever the main body portion is inserted into the recess, and locking means carried by the main body portion having a movable element protruding from the locking means in a locking position to engage a latching portion of the recess wall to prevent removal of the main body portion from the recess; and wherein the recess wall is movable relative to the locking means so as to enable independent disengagement of the movable element from the latching portion of the recess wall regardless of the position of the locking means.

7. The security system of claim 6 wherein the recess wall is hingedly coupled to the second side of the jack mounting wall for pivotal movement of the latching portion of the recess wall out of engagement with the movable element of the locking means.

8. The security system of claim 6 wherein the recess wall is hinged at a point outwardly of the latching portion to provide clearance for the movable element whenever the recess wall is pivotally moved away from engagement by the latching portion with the movable element and the jack security device is pulled out of the recess.

9. The security device of claim 6 wherein the recess wall includes an opening positioned such that whenever the latching portion of the recess wall is moved out of engagement with the movable member, the movable member will clear the recess wall when the jack securing device is pulled out of the recess.

10. The security system of claim 6 wherein the recess wall further includes a slot opening at the latching portion adjacent to an engagement location with the movable element, the recess wall being independently movable with respect to the locking means such that the slot will receive the movable element enabling its disengagement from the latching portion regardless of the position of the locking means.

11. The security system of claim 6 wherein the movable element comprises a spring loaded element for engaging the latching portion of the recess wall, the spring loaded element being accessible from the second side of the jack mounting wall and movable under pressure opposing the spring load out of engagement with the latching portion regardless of the position of the locking means.

12. The security system of claims 6, 7, 8, 9, 10 or 11 wherein the locking means comprises a key-actuated tumbler journaled for rotational movement in the main body portion, with a key receiving opening facing outwardly of the first side of the jack mounting wall and wherein the movable element comprises a locking tab movable with the tumbler into and out of engagement with the latching portion of the recess wall.

13. In an access cabinet for housing a plurality of access jacks for receipt of plug-ended communication line circuits, a security system for selectively preventing insertion and removal of a plug into and from any of the jacks opening at an outer surface of a jack mounting wall of the cabinet, the security system comprising:

a like plurality of recesses in the jack mounting wall each adjacent a corresponding jack opening and each having a recess wall coupled to an inner surface of the cabinet;

at least one jack securing device having a main body portion shaped for sliding receipt in any of the recesses, a tongue portion extending from the main body portion and configured so as to cover a portion of said jack opening whenever the main body portion is inserted into a corresponding recess, and key-actuated tumbler means journaled for rotational movement in the main body portion, the tumbler having a key receiving opening accessible from outside the cabinet and a locking tab protruding from and movable with the tumbler in the recess, the locking tab movable into and out of engagement with the latching portion of the recess wall in accordance with the position of a key insertable into the key receiving opening; and wherein the recess wall is movable from inside the cabinet relative to the locking tab so as to enable independent disengagement of the locking tab from the latching portion of the recess wall regardless of the key-actuated position of the tumbler means.

14. The security system of claim 13 wherein each tongue portion further comprises first and second members protruding from the main body portion to define a three-sided cable-receiving opening, the first and second members configured so as to prevent extraction of a plug matingly engaging a jack and to prevent insertion of a mating plug into an empty jack whenever the main body portion is inserted into a corresponding recess, and wherein the plurality of jacks and associated recesses are arranged such that at least a portion of the plurality of recesses share a common recess wall, thereby enabling substantially simultaneous independent disengagement of the locking tabs in the portion of the plurality of recesses from inside the cabinet.

15. The security system of claim 14 wherein the common recess wall is hingedly coupled to an inner surface of the cabinet for pivotal movement of the latching portions of the recess wall out of engagement with the locking tabs of the associated jack securing devices.

16. The security system of claim 14 wherein the common recess wall further includes a slot for each recess sharing the wall, each slot opening at the latching portion adjacent an engagement location for a corresponding locking tab, the common recess wall being independently movable with respect to the tumbler means such that each slot will receive its associated locking tab enabling the substantially simultaneous disengagement of each of the locking tabs from the latching portion.

17. The security system of claim 14 wherein the locking tab of each jack securing device comprises a spring loaded element, the common recess wall having openings for providing the latching portions for each spring loaded element.

18. The security system of claim 17 further comprising a shaft coupled to the common recess wall and carrying a release tab for each jack security device sharing the recess wall, each release tab abutting an associated spring loaded element, and a release lever coupled to the shaft operative to rotate the shaft and its associated release tabs so as to substantially simultaneously force the spring loaded elements out of engagement with the common wall.

19. In a jack mounting wall, apparatus for mating receipt of a jack security device having means for preventing insertion and removal of a plug into and from a jack opening at a first side of the jack mounting wall, the apparatus comprising:

a recess in the jack mounting wall adjacent to the jack, the recess having a recess wall coupled to a second side of the jack mounting wall, the recess being shaped for sliding mating receipt of a jack security device such that whenever the jack security device is inserted into the recess, a movable locking element protruding from the security device may be moved into locking engagement with a latching portion of the recessed wall to prevent removal of the security device from the recess; and wherein at least said latching portion of the recess wall is movable relative to the locking element to enable independent disengagement of the locking element from the latching portion regardless of the position of the locking element.

20. The apparatus of claim 19 wherein the recess wall is hingedly coupled to the second side of the jack mounting wall for pivotal movement of the latching portion of the recess wall out of engagement with the locking element.

21. The apparatus of claim 20 wherein the recess wall is hinged at a point outwardly of the latching portion to provide clearance for the locking element whenever the recess wall is pivotally moved away from engagement by the latching portion with the locking element and the jack security device is pulled out of the recess.

22. The apparatus of claim 20 wherein the recess wall includes an opening position such that whenever the latching portion of the recess wall is moved out of engagement with the locking element, the locking element will clear the recess wall when the jack security device is pulled out of the recess.

23. The apparatus of claim 19 wherein the recess wall further includes a slot opening at the latching portion adjacent to an engagement location with the locking element, the recess wall being independently movable with respect to the locking element such that the slot will receive the locking element enabling its disengagement from the latching portion.

24. In an access cabinet for housing a plurality of access jacks for receipt of plug-ended communication line circuits, apparatus for mating receipt of a like plurality of jack security devices having means for selectively preventing insertion and removal of a plug into and from a corresponding one of the jacks opening at an outer surface of a jack mounting wall of the cabinet, the apparatus comprising:

a like plurality of recesses in the jack mounting wall each adjacent corresponding jack and each having a recess wall coupled to an inner surface of the cabinet, each recess being shaped for sliding receipt of a jack security device such that whenever the jack security device is inserted into the recess, a movable locking element protruding from the security device may be moved into locking engagement with a latching portion of the recessed wall to prevent removal of the security device from the recess; and wherein at least said latching portion of the recess wall is movable relative to the locking element to enable independent disengagement of the locking element from the latching portion regardless of the position of the locking element.

25. The apparatus of claim 24 wherein the plurality of jacks and associated recesses are arranged such that at least a portion of the plurality of recesses share a common movable recess wall, thereby enabling substantially simultaneous independent disengagement of the locking element from the latching portion of the plurality of recesses from inside the cabinet.

26. The apparatus of claim 25 wherein the common recess wall is hingedly coupled to an inner surface of the cabinet for pivotal movement of the latching portions of the recess wall out of engagement with the locking elements of the associated jack securing devices.

27. The apparatus of claim 25 wherein the common recess wall further includes a slot for each recess sharing the wall, each slot opening at the latching portion adjacent an engagement location for the corresponding locking element, the common recess wall being independently movable with respect to the jack security device such that each slot will receive its associated locking element enabling the substantially simultaneous disengagement of each of the locking tabs from the locking portion.

28. The apparatus of claim 25 wherein the locking element of each jack securing device comprises a spring loaded element, the common recess wall having openings for providing the latching portions for each spring loaded element.

29. The apparatus of claim 28 further comprising a shaft coupled to the common recess wall and carrying a release tab for each jack security device sharing the recess wall, each release tab abutting an associated spring loaded element, and a release lever coupled to the shaft operative to rotate the shaft and its associated release tabs so as to substantially simultaneously force the spring loaded elements out of engagement with the common wall.

30. In an electrical plug and jack system in which at least one plug and at least one jack cooperate to selectively assume mated and unmated relationships, a security device comprising:

a panel means defining a first side and a second side and disposed relative to said jack whereby said jack is exposed for access by said plug from said first side and not exposed for access by said plug from said second side;

a first locking means for preventing change in at least one of said mated and unmated relationships;

said first locking means being removably secured to said panel and having a switchable element accessible from said first side and switchable between a locked position and an unlocked position for controlling a latch means movable between a locked position wherein said latch means engages said panel means and thereby prevents said change in at least one of said mated and unmated relationships and an unlocked position wherein said latch means disengages said panel means thereby permitting said first locking means to be removed from said panel, whereby said first locking means does not prevent said change in at least one of said mated and unmated relationships;

means accessible from said second side for overriding said latch means to disengage said latch means from said panel means to permit removal of said first locking means and thereby to permit change in at least one of said mated and unmated relationships while said switchable element is in said locked position;

restriction means for selectively inhibiting access to said second side and thereby preventing use of said overriding means.

* * * * *

UNITED STATES PATENT AND TRADEMARK OFFICE
CERTIFICATE OF CORRECTION

PATENT NO. : 4,846,708
DATED : July 11, 1989
INVENTOR(S) : Albert U. Marson et al.

It is certified that error appears in the above-identified patent and that said Letters Patent is hereby corrected as shown below:

Column 2, line 59,      "view" should be --views--.

Column 5, line 21,      "24" should be --240--.

Column 9, line 20,      "o" should be --on--.

Column 9, line 64,      after "body" insert --portion--.

Signed and Sealed this

Fifth Day of June, 1990

Attest:

HARRY F. MANBECK, JR.

*Attesting Officer*  *Commissioner of Patents and Trademarks*